UNITED STATES PATENT OFFICE 2,443,409

CELLULOSE COMPOUND CONTAINING A PLASTICIZER FORMED FROM A DIOLEFIN AND FORMALDEHYDE

Thomas C. Whitner, Elizabeth, N. J., assignor to Standard Oil Development Company, a corporation of Delaware No Drawing. Application October 28, 1941, Serial No. 416,804

4 Claims. (Cl. 106—183)

This invention relates to plasticizing agents which are applicable in the preparation of compositions containing cellulose ethers and esters. It relates more particularly to those plasticizing agents derived from conjugated diolefinic hydrocarbons.

One use for plasticizing agents is found in the formulation of lacquers. The latter are compositions which contain, for the most part, a soluble cellulose derivative (ether or ester), a compatible synthetic or natural resin, a volatile solvent which may be either an individual liquid or a mixture of liquids, and a plasticizing agent. The last-named ingredient is included for the purpose of rendering more pliable, ductile and elastic, the dried lacquer, that is the lacquer film secured on evaporation of the solvent. When such properties are imparted to the dried lacquer film, there may be avoided any cracking or peeling from the surface to which it has been applied. Furthermore, the adhesive qualities of the film are greatly improved.

Another use for plasticizing agents is in the manufacture of molded articles from cellulosic materials since incorporation of substantial proportions of such agents brings about a more rapid and even flow of the materials in the mold. In addition, molding operations may be conducted at much lower temperatures than when the plasticizer is absent.

I have observed that the products obtained on interaction of acyclic conjugated diolefins and an aldehyde, particularly in acidic media, possess the properties of plasticizing soluble cellulose derivatives and thereby imparting to films of such derivatives those desirable qualities just mentioned above. Furthermore, these interaction products may be employed in molding operations which involve use of cellulose derivatives.

By the term soluble cellulose derivatives are included cellulose ethers and cellulose esters. Examples of cellulose ethers are ethyl- and benzylcellulose, and of the esters are cellulose acetate, cellulose propionate and cellulose nitrate (often called nitrocellulose). The so-called mixed esters of cellulose are not precluded, i. e., esters containing two or more different ester groupings or radicals, as for example, cellulose acetate propionate or cellulose propionate butyrate. All of these cellulose derivatives, unlike the parent substance cellulose, are soluble in one or more organic solvents. Thus, cellulose nitrate is soluble in monoethyl ether of ethylene glycol and cellulose acetate is soluble in dioxan. Those liquids which are solvents for the cellulosic derivatives will also dissolve those materials which I find suitable as plasticizing agents.

Acyclic conjugated diolefins, such as butadiene, isoprene, pentadiene, hexadiene and the like are particularly suitable for my purpose. Interaction of conjugated diolefins and aldehyde may be effected, for example, by conducting a stream of the gaseous diolefin through a suspension or solution of the aldehyde. Preferably the liquid employed in such suspensions or solutions is also a solvent for the diolefin. A liquid which is suitable for my purpose is acetic acid. If the diolefin is a liquid at atmospheric temperature and pressure, then it may be added slowly to the aldehyde suspension and solution to effect interaction. Or the diolefin may be dissolved in the liquid medium and the aldehyde added slowly to this solution. Still another method comprises treatment of the gaseous diolefin under pressure with a solution or suspension of the aldehyde.

Preferably the liquid medium employed for interaction of conjugated diolefin and aldehyde is substantially anhydrous. A small proportion of water can be present without unduly decreasing the rate of reaction between the unsaturated hydrocarbon and aldehyde. A large proportion, however, is undesirable and should be avoided.

A catalyst or contact agent such as concentrated sulphuric acid should be present. Instead of this acid, a monocyclic aromatic sulphonic acid, e. g., benzenesulphonic acid or p-toluenesulphonic acid, may be employed. These latter compounds are strongly acidic materials and may be considered as derivatives of sulphuric acid.

During interaction the temperature of the reaction mixture should be maintained at 50° C. or less. Although interaction will take place at somewhat higher temperatures the product is likely to be highly discolored and in some instances even black. Temperatures within the range of 15° to 40° C., or thereabouts, have proven satisfactory.

After interaction is complete, the reaction mixture is diluted with at least an equal volume of water. An insoluble liquid product may separate, and this is removed, and if desired, washed with water, then with dilute aqueous alkali, again with water, and lastly warmed gently under reduced pressure to eliminate any entrained or dissolved water.

The diluted aqueous acid solution is neutralized with alkali or alkaline-earth hydroxide, carbonate or bicarbonate. The insoluble liquid which separates on neutralization is removed and treated as just described above. In some cases a thick mass of aqueous liquid and salt is secured on neutralization of the aqueous acid and the desired liquid product may be entrained in this mass. When this happens, either more water can be added to the mass to effect solution of the salt or the thick mass can be extracted with a low-boiling, inert solvent such as ethyl ether. Distillation of the latter yields the reaction product as a residue.

The aldehyde which I employ in the preparation of substances suitable for my purpose is formaldehyde. The latter is used preferably as its solid polymers, e. g., as paraform. In this condition it is a dry, solid powder which is readily handled and employment in this form does not necessitate introduction of any liquid into the reaction mixture as would be the case if, for example, an aqueous solution of the monomeric (or gaseous) aldehyde was used. In some instances, however, it may be desirable to pass the gaseous aldehyde into a solution of the diolefin in acetic acid or to conduct simultaneously both gaseous aldehyde and gaseous diolefin into the liquid medium.

It has been observed that interaction products of diolefins and aldehydes in substantially anhydrous acetic acid are liquids which appear to be esters or contain a large proportion of esters (since they react, for example, with potassium hydroxide) and to be highly unsaturated (as they quickly decolorize solutions of bromine). They possess high boiling points, often above 325° C. at atmospheric pressure, and therefore are only slightly volatile or substantially non-volatile at atmospheric temperature. Also, these liquids are solvents for soluble cellulose compounds. In addition, these interaction products will dissolve many types of resinous bodies. Furthermore, these liquid products are soluble in a large number of organic solvents, but substantially insoluble in water. All of these properties make the interaction products of conjugated diolefins and formaldehyde admirably suitable as ingredients for the formulation of lacquers.

Interaction of formaldehyde and conjugated diolefins appears to furnish a mixture of compounds as the reaction product. I have found that the latter, i. e., the mixture, may be employed as a plasticizing agent; in some instances, it may be subjected to fractional distillation and one or more fractions obtained which are suitable for my purpose. In case resort to fractional distillation is made, it may be necessary that this operation should be conducted under reduced pressure to avoid considerable, if not substantially complete, decomposition of the material.

The following examples will serve to illustrate my invention.

*Example 1.*—Into a mixture consisting of 2.2 mols of paraform, ⅓ mol of concentrated sulphuric acid and 3.66 mols of glacial acetic acid was conducted 0.42 mol of butadiene. The time required for addition of the diolefin was 6.5 hours. During passage of the olefin the reaction mixture was stirred constantly and the temperature maintained at approximately 40° C. After all of the diolefin had been passed into the reaction mixture, the latter was filtered from any undissolved and unreacted paraform. The filtrate then was diluted with an equal volume of water. About 90% of the acid in the resulting aqueous solution was neutralized by addition of sodium carbonate, and afterwards complete neutralization effected by the addition of sodium bicarbonate. The solid salt and liquid portions were separated by filtration and both were extracted several times with ethyl ether. All of the ether solutions were combined, and the ether removed by distillation, leaving the liquid reaction product as a residue. The last traces of ether (together with any entrained water) were eliminated by gently heating the distillation residue under reduced pressure.

*Example 2.*—Interaction between butadiene and formaldehyde was effected as described in Example 1 with the exceptions that approximately 0.5 mol of the diolefin was used and the time of reaction was shortened to 5 hours. The reaction product was isolated as described in Example 1.

*Example 3.*—Small portions of ethyl cellulose, cellulose acetate and cellulose nitrate were placed in small tubes. To each of the samples was added a sufficient volume of the liquid as prepared in either Example 1 or Example 2 to cover the cellulose derivative completely. After a few hours, it was noted that in each instance the cellulose derivative had dissolved in the liquid.

*Example 4.*—A coating composition was prepared by dissolving 1 part of ethyl cellulose in a mixture of 20 parts of dioxan and 0.5 part of butadiene-formaldehyde reaction product. For purposes of comparison a similar composition was made which did not contain the reaction product. Portions of each of these compositions were poured onto glass plates, and permitted to dry slowly. Clear, smooth films were secured. The one containing the reaction product was pliable while the other was distinctly brittle.

*Example 5.*—Another composition was made by dissolving 2 parts of cellulose acetate in a mixture of 30 parts of acetone and 20 parts of ethyl acetate to which had been added 0.5 part of butadiene-formaldehyde reaction product. The film obtained (on glass) from this composition was flexible while that from a similar composition which did not contain the reaction product was brittle and easily broken.

*Example 6.*—In 50 parts of dioxan and 5 parts of the butadiene-formaldehyde reaction product were dissolved 0.5 part of Aroclor 5460 (a solid, synthetic resin made by chlorinating biphenyl) and 5 parts of ethyl cellulose. A film secured from this composition was very pliable and flexible. A similar composition, but containing none of the reaction product, yielded a brittle film.

*Example 7.*—Three parts of cellulose acetate, 0.15 part of a compatible glycerol-phthalate resin and 6 parts of butadiene-formaldehyde reaction product were dissolved in 30 parts of dioxan. This composition yielded films which were very pliable and in fact quite rubber-like and could be extended or stretched to a considerable extent without breaking or rupturing. A like composition, but from which the reaction product was omitted, furnished fragile and easily broken films.

*Example 8.*—Another composition was made by dissolving 0.2 part of ester gum (the glycerol ester of rosin), 1.5 parts of nitrocellulose and 1.5 parts of butadiene-formaldehyde reaction product in 37 parts of diacetone alcohol. This composition yielded pliable well-plasticized films. A similar composition which did not contain the plasticizer furnished films which were brittle.

The reaction product in this instance was a fraction which distilled at 86° to 114° C. under a vacuum of 28 inches of mercury.

*Example 9.*—A plasticizing agent suitable for my purpose was prepared in the following manner: 1 mol of paraform was added to 3.66 mols of glacial acetic acid and 0.3 mol of concentrated sulphuric acid. While the mixture was kept agitated continually and the temperature maintained at 10–15° C., 1.35 mols of butadiene were passed into the mixture over a period of 14 hours. At the end of this period of time the reaction mixture was diluted with an equal volume of water. The oily layer thereupon separating was removed, washed with water, then dilute aqueous sodium bicarbonate, and finally with water. Warming the oily product under reduced pressure removed entrained and/or dissolved water.

The aqueous solution of acetic acid from the above-mentioned operations was partially neutralized by addition of sodium carbonate and then neutralization completed by addition of sodium bicarbonate. The additional oily layer which separated upon neutralization was treated as described above.

*Example 10.*—A plasticizing agent was made by employing the procedure given in Example 9, but using the following proportions of materials: 1 mol of paraform, 1.83 mols of glacial acetic acid, about 0.03 mol of p-toluenesulphonic acid, and 1.17 mols of butadiene conducted over a period of 12 hours into the mixture.

The agents suitable for my purpose are prepared by subjecting a conjugated diolefin, e. g., butadiene, to the action of formaldehyde in the presence of a liquid medium which is substantially anhydrous, is a solvent for the olefinic hydrocarbon and does not interact with the aldehyde. There should be dissolved in the liquid medium a contact agent or catalyst such as sulphuric acid or a monocyclic aromatic sulphonic acid. The temperature of the reaction mixture should be fairly low, e. g., in the temperature range of 15° to 40° C.

My invention includes the plasticized cellulosic compositions resulting from incorporating the cellulose ether or ester with the plasticizing agent. The proportion of cellulose ether or ester to plasticizer may be varied within wide limits. As small as 20 to 25% plasticizer (based on the weight of cellulosic material) will furnish compositions which are flexible or pliable. Large proportions, say 100 to 200%, will yield cellulosic compositions which are not only flexible and pliable but also rubber-like in that they possess a considerable degree of elasticity.

The plasticizing agents made according to my process are liquid which are substantially insoluble in water but are soluble in a wide variety of solvents, as for example, hydrocarbons (such as gasoline, benzene, toluene, etc.) chlorinated hydrocarbons, and oxygenated hydrocarbons (e. g., esters, ethers, acids, ketones and the like). These plasticizing agents also are solvents not only for cellulose ethers and esters but also for many synthetic resins and are therefore suitable for the preparation of many types of lacquers or coating compositions involving the use of soluble cellulosic materials and synthetic resins compatible therewith.

What I claim is:

1. A composition comprising a cellulose derivative selected from the group consisting of cellulose ethers and esters soluble in organic liquids, and a plasticizer not more than slightly volatile at atmospheric temperature and composed essentially of the mixed reaction product of an acyclic aliphatic conjugated diolefin and formaldehyde, said reaction product having been formed in the presence of substantially anhydrous acetic acid and at a temperature not less than about 10° C. and not more than about 40° C.

2. Composition according to claim 1, in which the reaction product is prepared from butadiene and formaldehyde.

3. A composition comprising ethyl cellulose and the reaction product of butadiene and formaldehyde, said product having been formed in the presence of substantially anhydrous acetic acid at a temperature not less than about 10° C. and not more than about 40° C., and having the property of acting as a plasticizer.

4. A composition comprising cellulose nitrate and the reaction product of butadiene and formaldehyde, said product having been formed in the presence of substantially anhydrous acetic acid at a temperature not less than about 10° C. and not more than about 40° C., and having the property of acting as a plasticizer.

THOMAS C. WHITNER.

REFERENCES CITED

The following references are of record in the file of this patent:

UNITED STATES PATENTS

| Number | Name | Date |
|---|---|---|
| 1,522,852 | Young | Jan. 13, 1925 |
| 1,735,156 | Carroll | Nov. 12, 1929 |
| 1,899,214 | Smith | Feb. 28, 1933 |
| 1,933,716 | Day | Nov. 7, 1933 |
| 2,017,070 | Lazier | Oct. 15, 1935 |
| 2,246,285 | Arundale et al. | June 17, 1941 |

FOREIGN PATENTS

| Number | Country | Date |
|---|---|---|
| 717,712 | France | Jan. 13, 1932 |

OTHER REFERENCES

"The Chemistry of Petroleum Derivatives," Ellis, 1934.

Chemical Catalogue Co., Inc., New York, page 586.

"Synthetic Rubber," Schotz (1926), page 73.